United States Patent
Masuda

(10) Patent No.: US 11,326,548 B2
(45) Date of Patent: May 10, 2022

(54) ENGINE

(71) Applicant: SUBARU CORPORATION, Tokyo (JP)

(72) Inventor: Naoki Masuda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/061,724

(22) Filed: Oct. 2, 2020

(65) Prior Publication Data

US 2021/0140390 A1 May 13, 2021

(30) Foreign Application Priority Data

Nov. 12, 2019 (JP) .............................. JP2019-204414

(51) Int. Cl.
*F02F 1/42* (2006.01)

(52) U.S. Cl.
CPC ................................. *F02F 1/4235* (2013.01)

(58) Field of Classification Search
CPC ... F02B 1/04; F02M 35/108; F02M 35/10118; F02M 35/10386; F02F 1/4228
USPC ....................................................... 123/193.5
See application file for complete search history.

(56) References Cited

U.S. PATENT DOCUMENTS

| | | | | |
|---|---|---|---|---|
| 3,171,395 A * | 3/1965 | Bartholomew | ...... | F02M 35/108 123/584 |
| 3,678,905 A * | 7/1972 | Diehl | ...... | F02B 75/22 123/432 |
| 3,744,463 A * | 7/1973 | McFarland, Jr. | .... | F02M 35/116 123/184.34 |
| 4,159,011 A * | 6/1979 | Sperry | ................. | F02F 1/4235 123/188.14 |
| 4,475,486 A * | 10/1984 | Kessler | ................ | F02M 51/005 123/184.21 |
| 4,519,350 A * | 5/1985 | Oda | ................. | F02M 35/10118 123/308 |
| 5,054,456 A * | 10/1991 | Rush, II | ................. | F02M 69/08 123/531 |
| 6,848,408 B1 * | 2/2005 | Mendler | ......... | F02M 35/10098 123/184.21 |
| 2017/0114711 A1 * | 4/2017 | Suekuni | ................ | F02D 9/1095 |

FOREIGN PATENT DOCUMENTS

| | | |
|---|---|---|
| JP | 2003-262132 A | 9/2003 |
| JP | 2015-190373 A | 11/2015 |
| JP | 2016-180356 A | 10/2016 |

* cited by examiner

*Primary Examiner* — Long T Tran
*Assistant Examiner* — James J Kim
(74) *Attorney, Agent, or Firm* — Troutman Pepper Hamilton Sanders LLP

(57) ABSTRACT

An engine includes a combustion chamber, and a cylinder head. The cylinder head has an intake port communicating with the combustion chamber. The intake port includes a first inner wall and a second inner wall as inner walls that are provided from an upstream side to a downstream side. A valve guide hole opens onto the first inner wall. The second inner wall faces the first inner wall. The first inner wall includes a first concavely curved surface configured to vary a flowing direction of intake air. The second inner wall includes a second concavely curved surface configured to vary the flowing direction of the intake air.

14 Claims, 19 Drawing Sheets

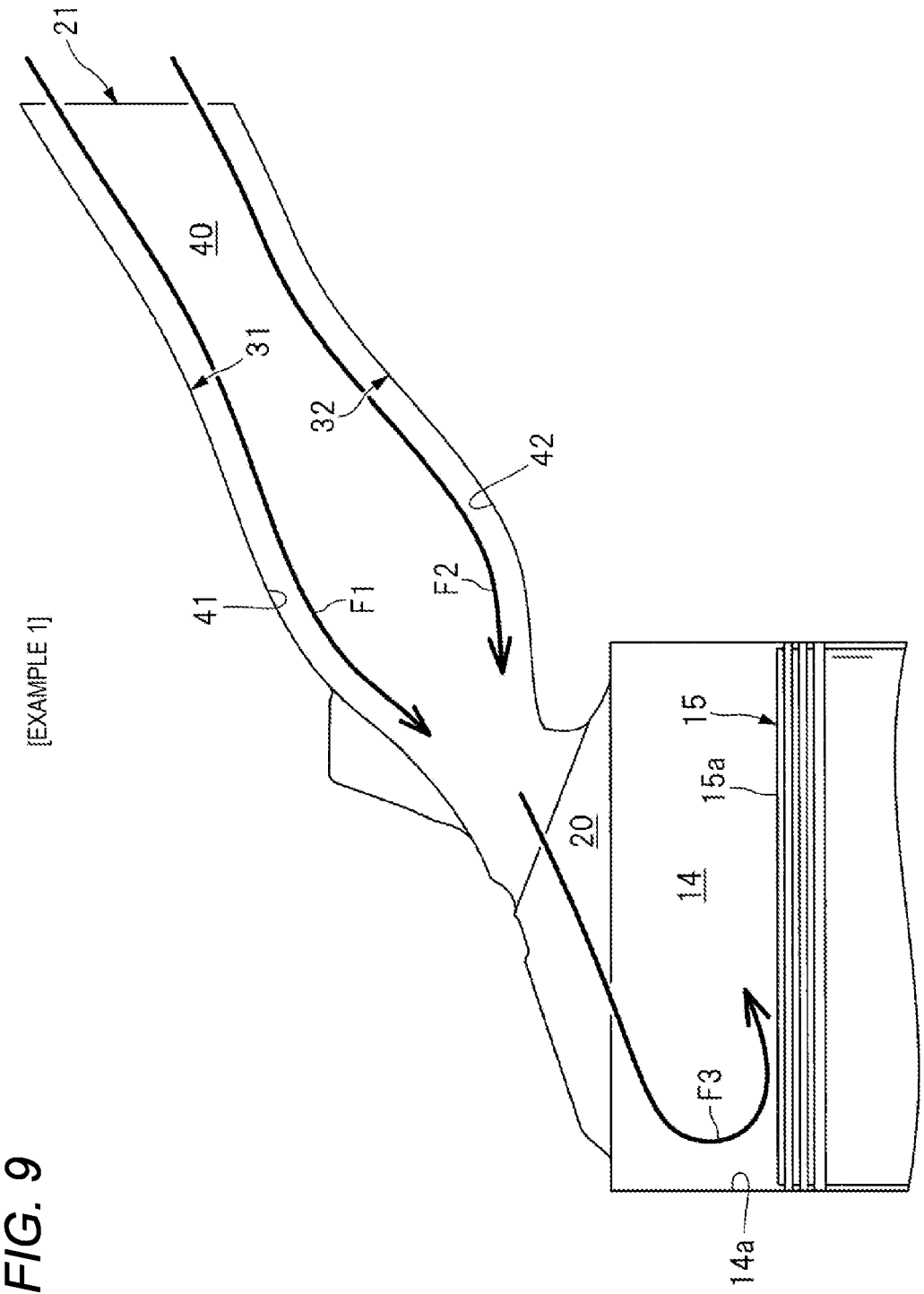

[EXAMPLE 2]

ENGINE

CROSS-REFERENCE TO RELATED APPLICATIONS

The present application claims priority from Japanese Patent Application No. 2019-204414 filed on Nov. 12, 2019, the entire contents of which are hereby incorporated by reference.

BACKGROUND

The disclosure relates to an engine to which an intake port is formed.

An intake port that communicates with a combustion chamber is formed at a cylinder head of an engine. The shape of the intake port affects strength of, e.g., a tumble flow, as well as increase and decrease in a flow rate of intake air. Thus, from the point of view of increasing the flow rate of the intake air and the point of view of enhancing a gas flow, e.g., a tumble flow, intake ports with various shapes have been developed (refer to Japanese Unexamined Patent Applications Publication Nos. 2003-262132, 2015-190373, and 2016-180356).

SUMMARY

An aspect of the disclosure provides an engine includes a combustion chamber, and a cylinder head. The cylinder head has an intake port communicating with the combustion chamber. The intake port includes a first inner wall and a second inner wall as inner walls that are provided from an upstream side to a downstream side. A valve guide hole opens onto the first inner wall. The second inner wall faces the first inner wall. The first inner wall includes a first concavely curved surface configured to vary a flowing direction of intake air. The second inner wall includes a second concavely curved surface configured to vary the flowing direction of the intake air.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 9 simply illustrates flows of intake air that passes through the intake port of Example 1 of the disclosure.

DETAILED DESCRIPTION

In designing the shape of an intake port, it is difficult to achieve both increasing a flow rate and enhancing flow of intake air. That is, designing an intake port so as to increase the flow rate of intake air is a cause of diminishing the flow of intake air. Conversely, designing an intake port so as to enhance the flow of intake air is a cause of decreasing the flow rate of intake air.

It is desirable to achieve both increasing a flow rate and enhancing flow of intake air.

Figure 1:
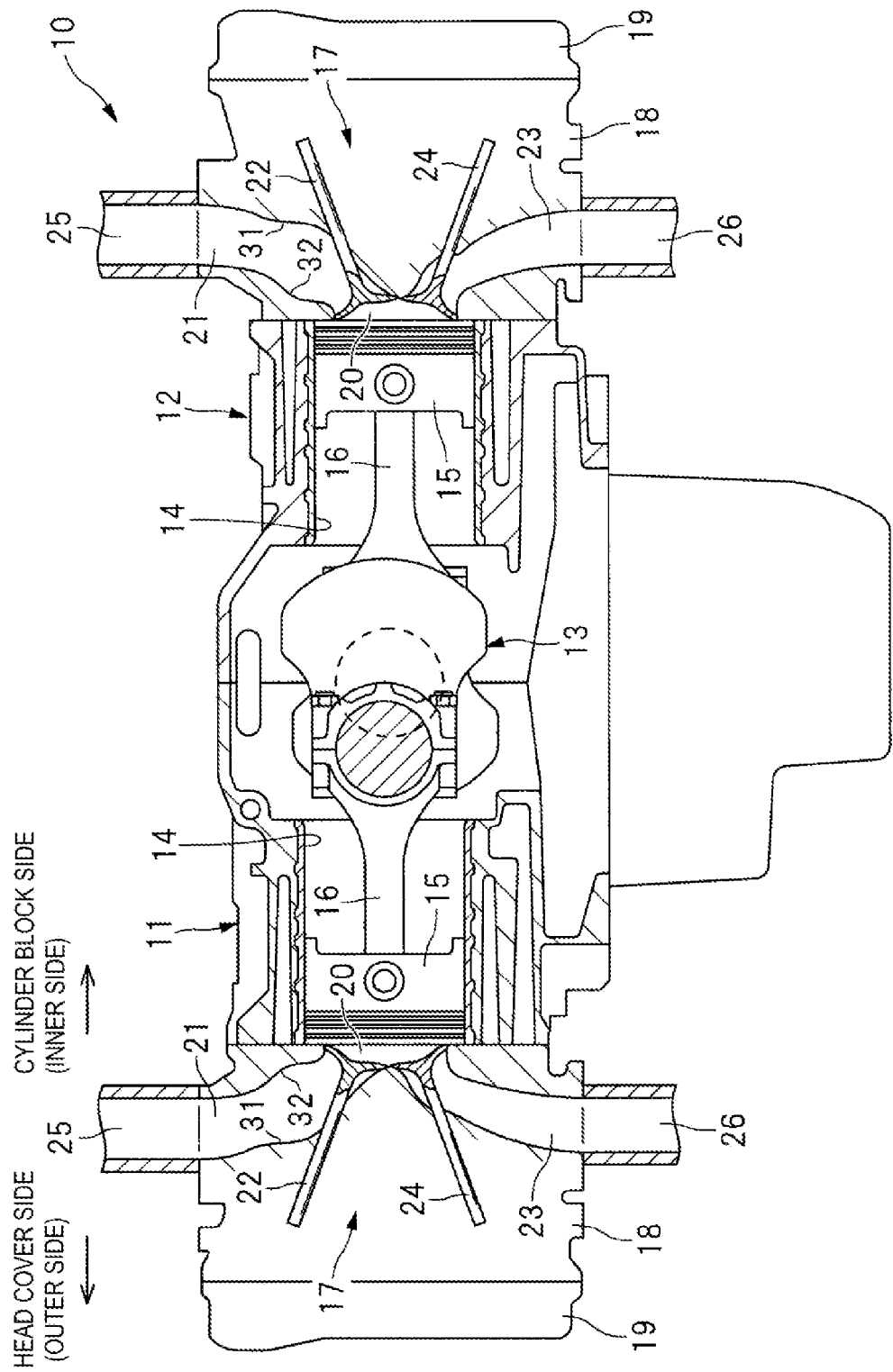
FIG. 1 is a schematic diagram illustrating an engine according to an embodiment of the disclosure.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Structure of Engine FIG. 1 is a schematic diagram illustrating an engine 10 according to an embodiment of the disclosure. As illustrated in FIG. 1, the engine 10 includes a cylinder block 11 provided to one cylinder bank, a cylinder block 12 provided to the other cylinder bank, and a crankshaft 13 supported by the pair of cylinder blocks 11 and 12. A cylinder bore 14 is formed in each of the cylinder blocks 11 and 12 and houses a piston 15. The piston 15 is coupled to the crankshaft 13 via a connecting rod 16.

Each of the cylinder blocks 11 and 12 is assembled with a cylinder head 18 that has a valve driving mechanism 17. The cylinder head 18 is assembled with a head cover 19 that covers the valve driving mechanism 17. The cylinder head 18 includes an intake port 21 that communicates with a combustion chamber 20, and the cylinder head 18 is assembled with an intake valve 22 that opens and closes the intake port 21. The cylinder head 18 also includes an exhaust port 23 that communicates with the combustion chamber 20, and the cylinder head 18 is assembled with an exhaust valve 24 that opens and closes the exhaust port 23. The intake port 21 is coupled to an intake manifold 25 that guides intake air. The exhaust port 23 is coupled to an exhaust manifold 26 that guides exhaust gas.

Structure of Intake Port

Figure 2:
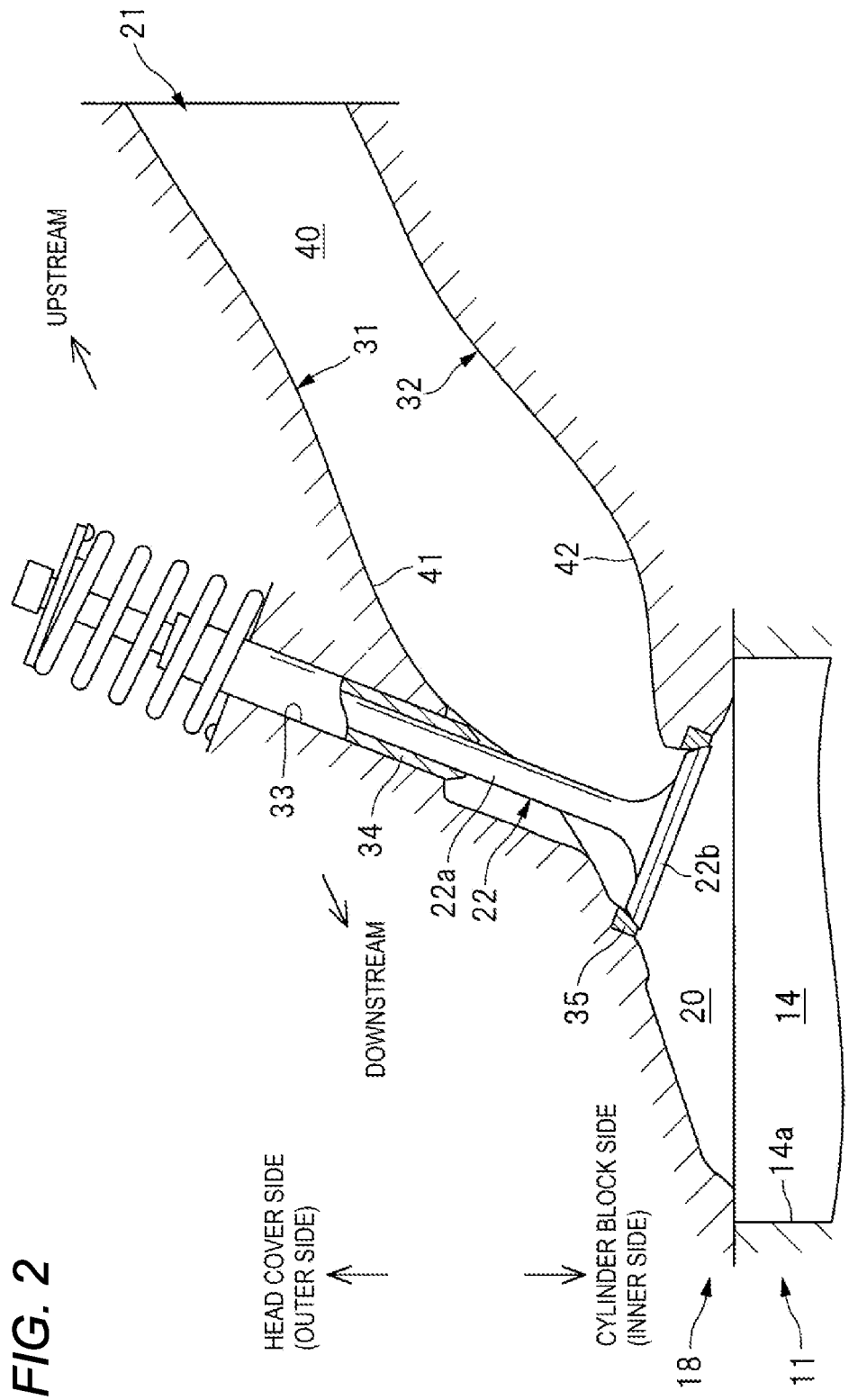
FIG. 2 is a sectional view illustrating an intake port and a combustion chamber as well as an intake valve.
Figure 3:
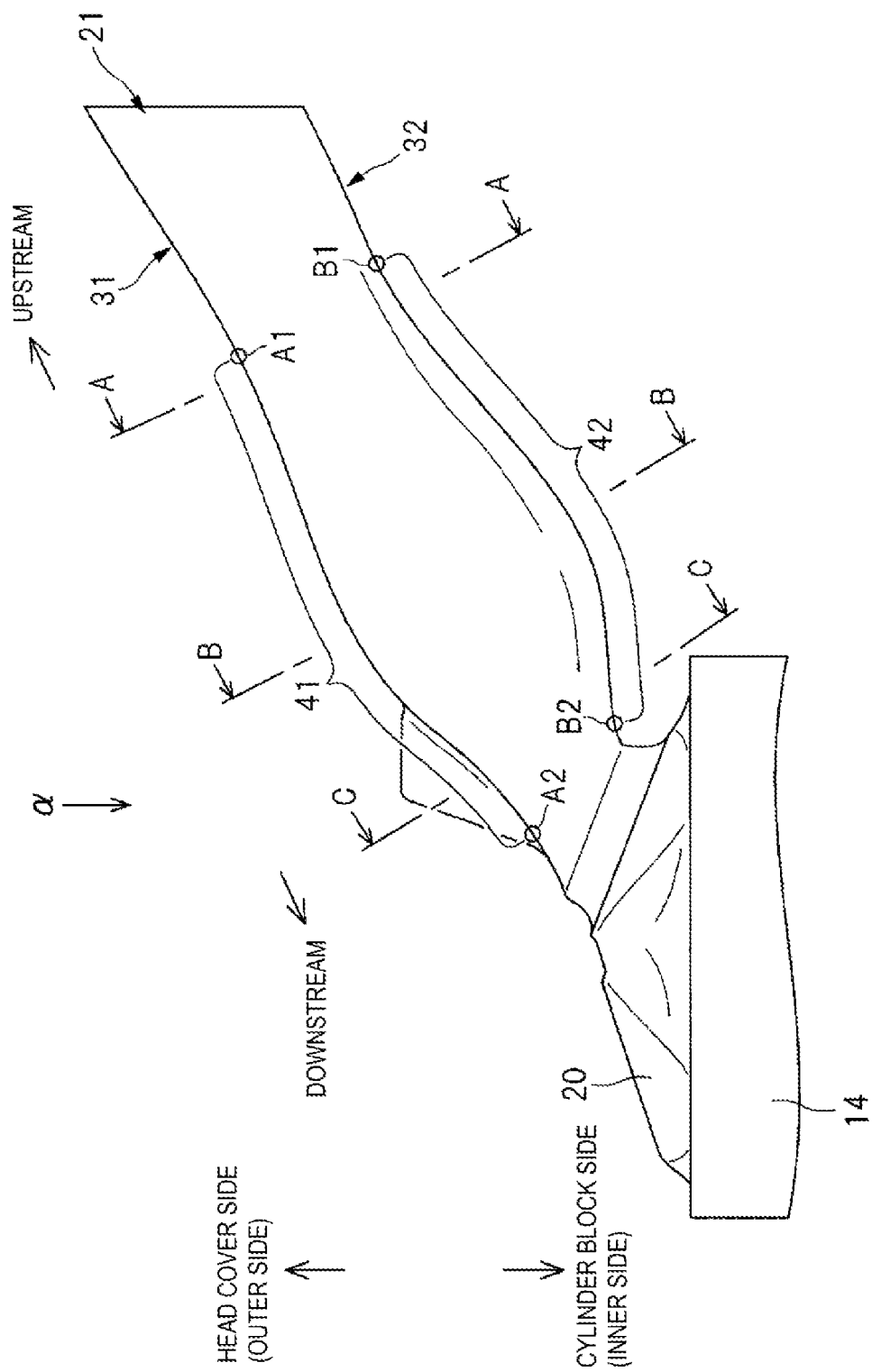
FIG. 3 illustrates shapes of the intake port and the combustion chamber formed in a cylinder head.
Figure 4:
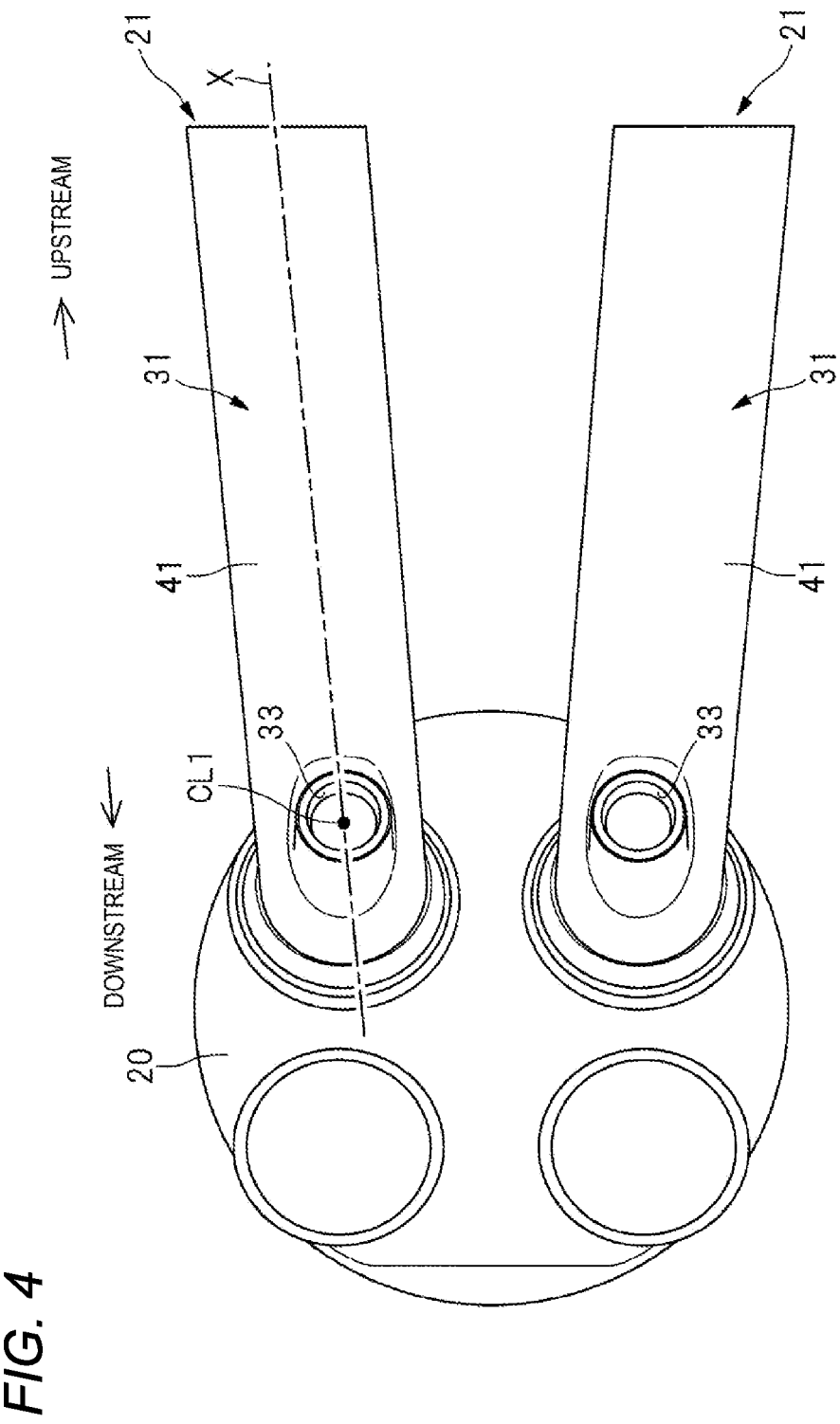
FIG. 4 illustrates shapes of the intake port and the combustion chamber as viewed from the arrow a direction in FIG. 3.
Figure 5:
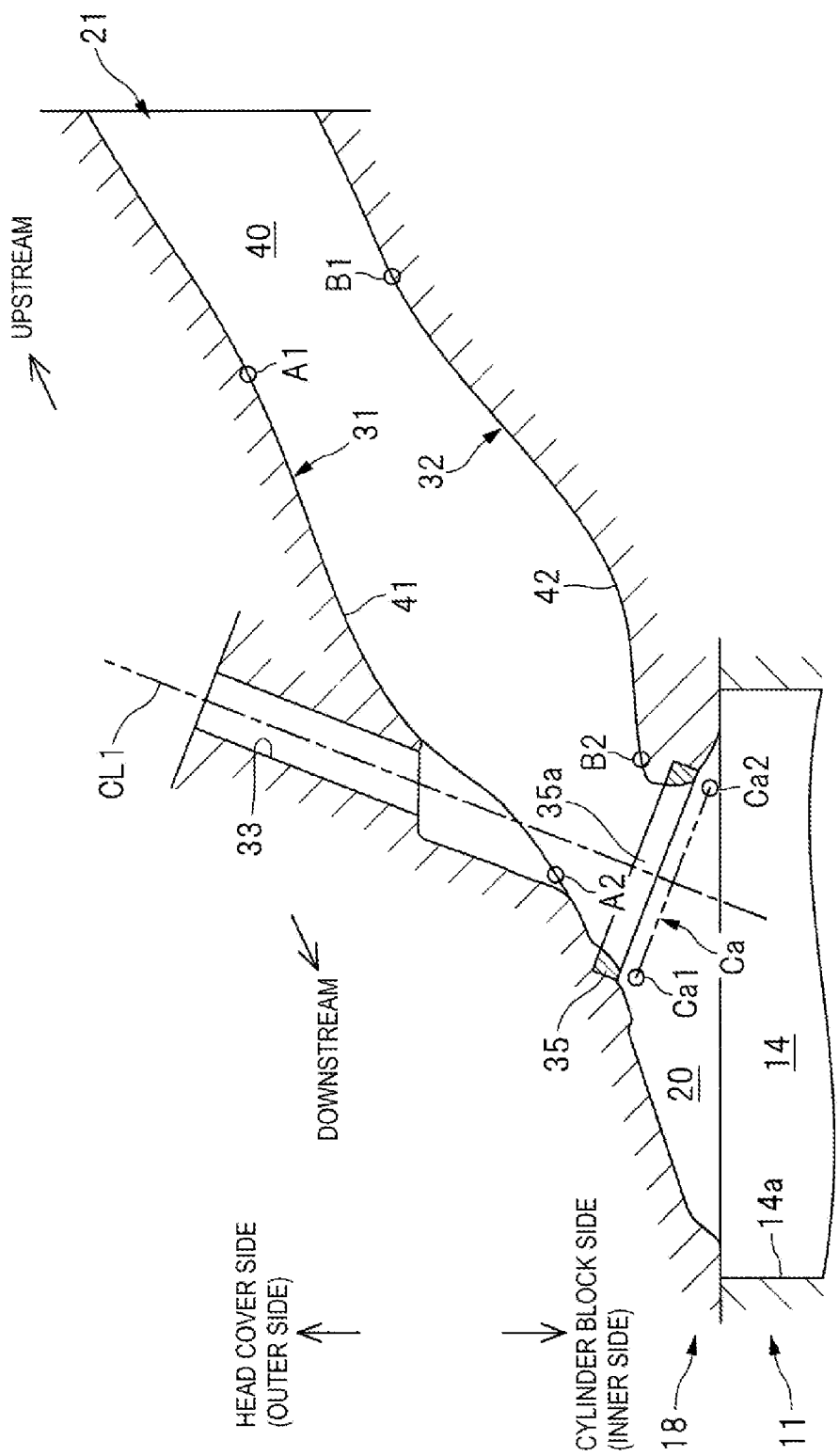
FIG. 5 is a sectional view illustrating the intake port and the combustion chamber, along the imaginary plane X in FIG. 4.

The following describes an intake port 21 of Example 1 of the disclosure. FIG. 2 is a sectional view illustrating the intake port 21 and the combustion chamber 20 as well as the intake valve 22. FIG. 3 illustrates shapes of the intake port 21 and the combustion chamber 20 that are formed in the cylinder head 18. FIG. 4 illustrates shapes of the intake port 21 and the combustion chamber 20 as viewed from the arrow a direction in FIG. 3. FIG. 5 is a sectional view illustrating the intake port 21 and the combustion chamber 20, along the imaginary plane X in FIG. 4.

It is noted that FIGS. 2 to 5 illustrate the intake port 21 and other parts in the condition of being rotated by 90 degrees from the state illustrated in FIG. 1. The exhaust port 23 is omitted in FIGS. 2 to 5. The words "UPSTREAM" and "DOWNSTREAM" illustrated in FIGS. 2 to 5 mean upstream and downstream of the flowing direction of intake air to the combustion chamber 20. In addition, the imaginary plane X illustrated in FIG. 4 is an imaginary plane including a center line CL1 of a valve guide hole 33 and intersecting first and second concavely curved surfaces 41 and 42. The valve guide hole 33 and the first and the second concavely curved surfaces 41 and 42 will be described later.

As illustrated in FIGS. 2 to 5, the intake port 21 that is formed in the cylinder head 18 has a first inner wall 31 and a second inner wall 32 as inner walls provided from the upstream side to the downstream side. The first inner wall 31 is positioned on the outer side of the engine 10, that is, on the head cover 19 side. The second inner wall 32 is positioned on the inner side of the engine 10, that is, on the cylinder block 11 (12) side. As illustrated in FIG. 2, the valve guide hole 33 opens onto the first inner wall 31 of the intake port 21. A valve guide 34 for supporting a stem 22a of the intake valve 22 is inserted into the valve guide hole 33. Thus, the intake port 21 is provided with the first inner wall 31 on to which the valve guide hole 33 opens, and is also provided with the second inner wall 32 that faces the first inner wall 31. In addition, an open end of the intake port 21 facing the combustion chamber 20 is provided with a valve seat 35 that is contactable with a bevel part 22b of the intake valve 22.

As illustrated in FIGS. 2, 3, and 5, the first inner wall 31 of the intake port 21 has a first concavely curved surface 41, and the second inner wall 32 of the intake port 21 has a second concavely curved surface 42. The first concavely curved surface 41 is concaved toward the head cover 19 to expand an intake passage 40. The second concavely curved surface 42 is concaved toward the cylinder block 11 to expand the intake passage 40. The first concavely curved surface 41 is formed on the first inner wall 31 to be closer to the downstream side than the upstream side. The second concavely curved surface 42 is formed on the second inner wall 32 to be closer to the downstream side than the upstream side. The first and the second concavely curved surfaces 41 and 42 are disposed so as to at least partially face each other. As illustrated in FIGS. 3 and 5, the first concavely curved surface 41 is a region concaved toward the head cover 19, that is, a region between inflection points A1 and A2 existing on the first inner wall 31, and the second concavely curved surface 42 is a region concaved toward the cylinder block 11, that is, a region between inflection points B1 and B2 existing on the second inner wall 32.

Figure 6:
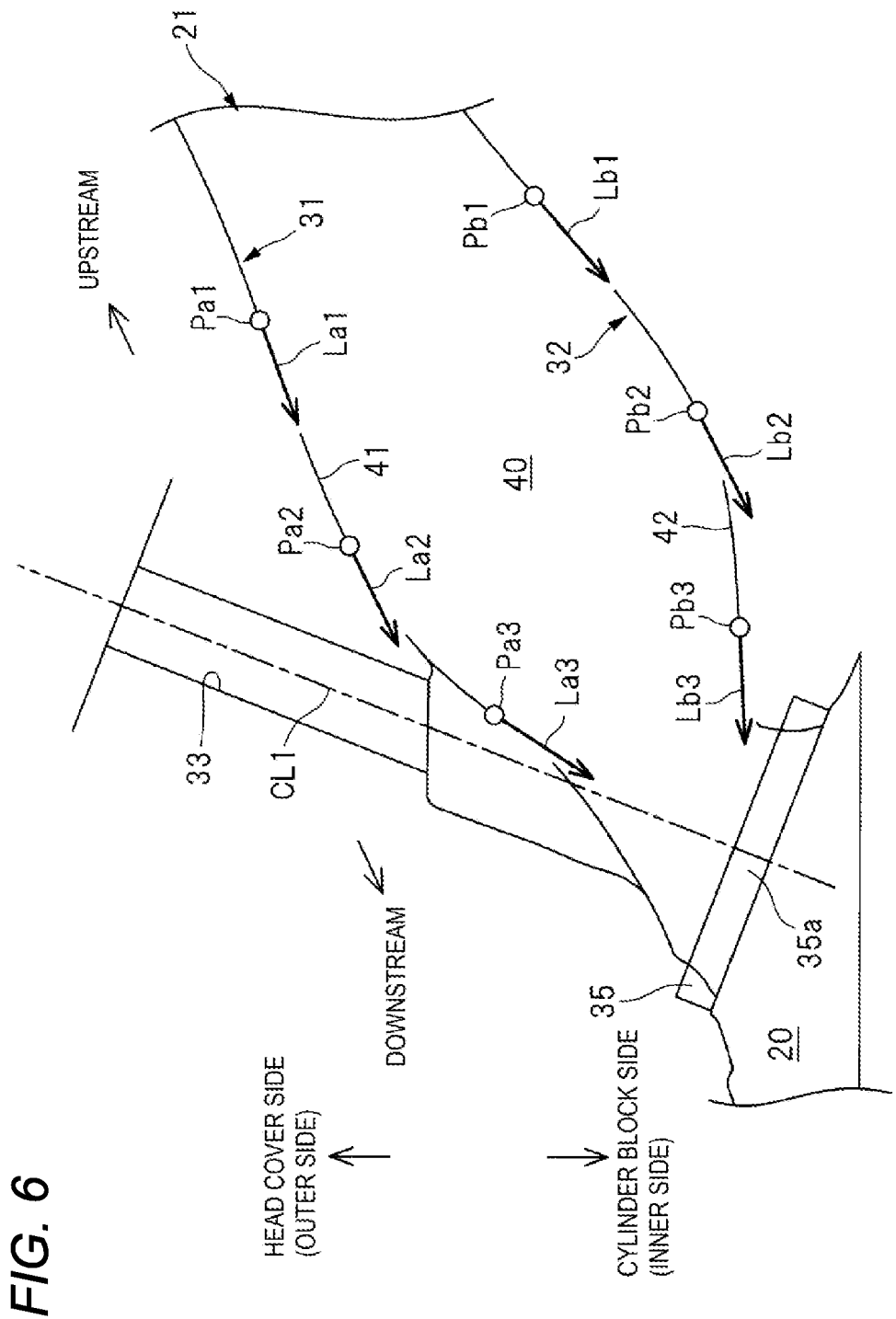
FIG. 6 is a sectional view of an enlarged part of the intake port illustrated in FIG. 5.
Figure 7A:
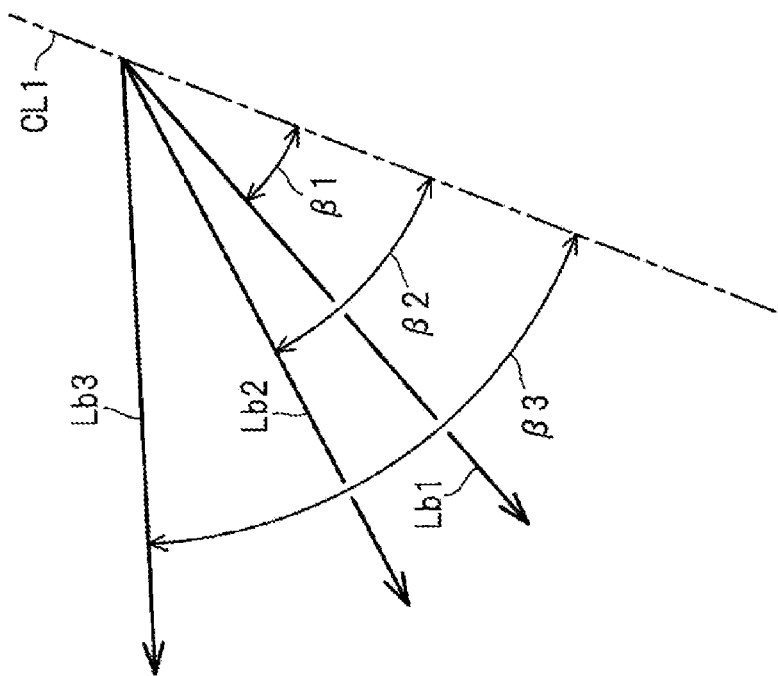
FIG. 7A illustrates relationships between tangent lines of a first concavely curved surface and a center line of a valve guide hole.
Figure 7B:
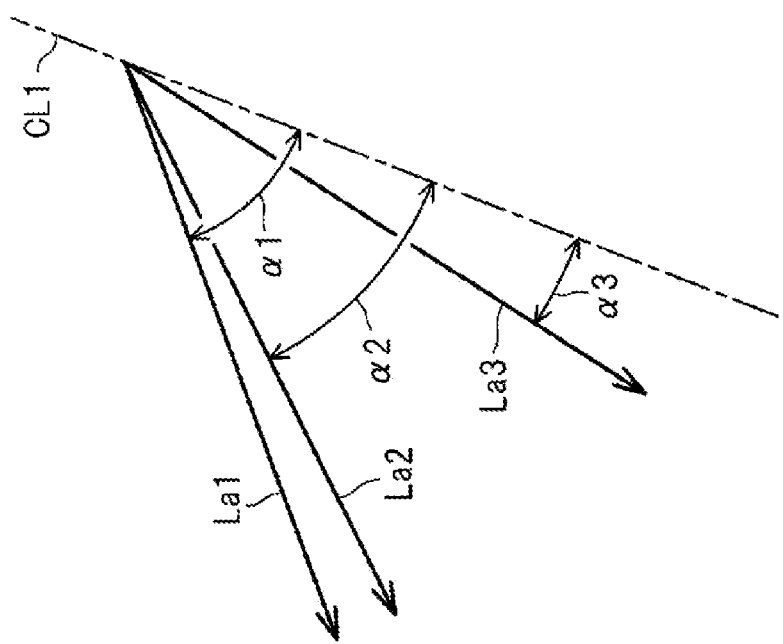
FIG. 7B illustrates relationships between tangent lines of a second concavely curved surface and the center line of the valve guide hole.

FIG. 6 is a sectional view of an enlarged part of the intake port 21 illustrated in FIG. 5. FIG. 6 illustrates a sectional view along the imaginary plane X including the center line CL1 of the valve guide hole 33. FIG. 7A illustrates relationships between tangent lines La1 to La3 of the first concavely curved surface 41 and the center line CL1 of the valve guide hole 33. FIG. 7B illustrates relationships between tangent lines Lb1 to Lb3 of the second concavely curved surface 42 and the center line CL1 of the valve guide hole 33. Each of the tangent lines La1 to La3 and Lb1 to Lb3 illustrated in FIGS. 6, 7A, and 7B is a tangent line in the imaginary plane X including the center line CL1 of the valve guide hole 33.

As illustrated in FIG. 6, the tangent lines La1 to La3 at points Pa1 to Pa3 of the first concavely curved surface 41 gradually slant in a direction along the center line CL1, from the upstream side to the downstream side. More specifically, as illustrated in FIG. 7A, an angle $\alpha 3$ between the center line CL1 and the tangent line La3 is smaller than an angle $\alpha 2$ between the center line CL1 and the tangent line La2, and the angle $\alpha 2$ is smaller than an angle $\alpha 1$ between the center line CL1 and the tangent line La1. That is, among angles between the tangent lines La1 to La3 of the first concavely curved surface 41 and the center line CL1 of the valve guide hole 33, the angles $\alpha 1$ to $\alpha 3$ on the acute angle side gradually decrease from the upstream side to the downstream side.

As illustrated in FIG. 6, the tangent lines Lb1 to Lb3 at points Pb1 to Pb3 of the second concavely curved surface 42 gradually slant in a direction orthogonal to the center line CL1, from the upstream side to the downstream side. More specifically, as illustrated in FIG. 7B, an angle $\beta 3$ between the center line CL1 and the tangent line Lb3 is larger than an angle $\beta 2$ between the center line CL1 and the tangent line Lb2, and the angle $\beta 2$ is larger than an angle $\beta 1$ between the center line CL1 and the tangent line Lb1. That is, among angles between the tangent lines Lb1 to Lb3 of the second concavely curved surface 42 and the center line CL1 of the valve guide hole 33, the angles $\beta 1$ to $\beta 3$ on the acute angle side gradually increase from the upstream side to the downstream side.

Figure 8A:
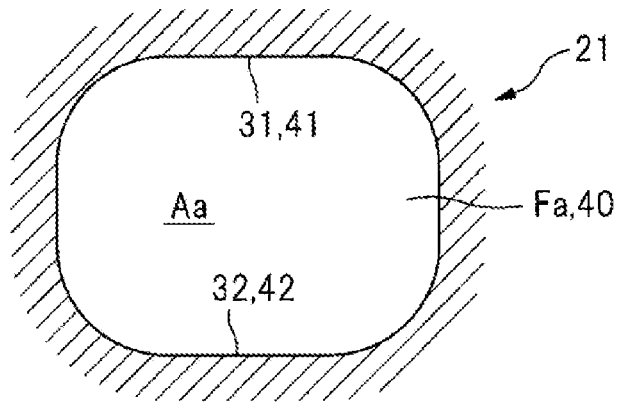
FIGS. 8A to 8C illustrate intake passages of parts of the intake port.
Figure 8B:
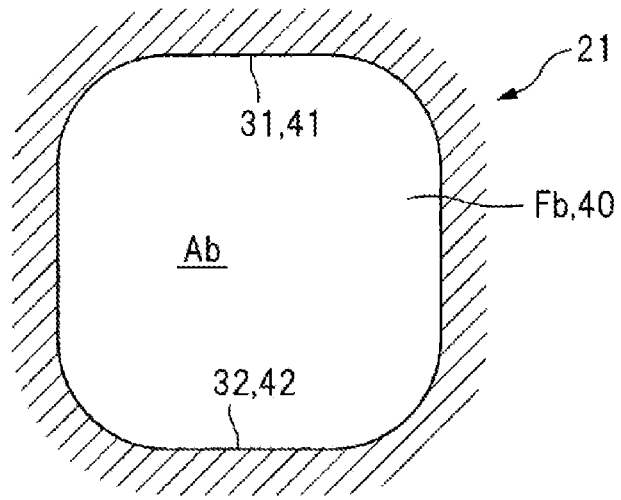
Figure 8C:
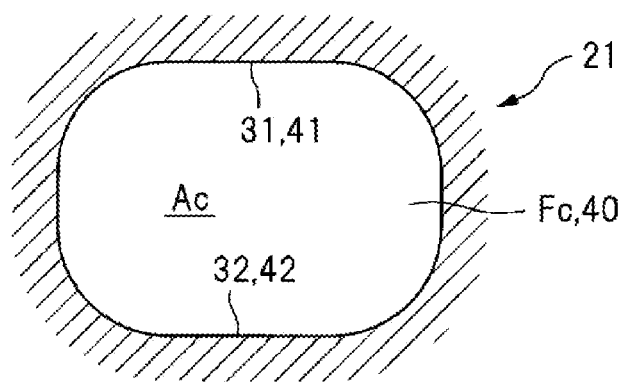

Next, a cross sectional area of the intake passage 40 of the intake port 21 will be described. FIGS. 8A to 8C illustrate intake passages Fa to Fc of parts of the intake port 21. FIG. 8A illustrates a cross section of the intake passage Fa along the A-A line in FIG. 3. FIG. 8B illustrates a cross section of the intake passage Fb along the B-B line in FIG. 3. FIG. 8C illustrates a cross section of the intake passage Fc along the C-C line in FIG. 3.

As illustrated in FIGS. 8A and 8B, a cross sectional area Ab of the intake passage Fb is larger than a cross sectional area Aa of the intake passage Fa. As illustrated in FIGS. 8B and 8C, a cross sectional area Ac of the intake passage Fc is smaller than the cross sectional area Ab of the intake passage Fb. Thus, due to forming the first and the second concavely curved surfaces 41 and 42 respectively to the first and the second inner walls 31 and 32 of the intake port 21, a cross sectional area of the intake passage 40 of the intake port 21 increases and then decreases from the upstream side to the downstream side. In one embodiment, the cross sectional area of the intake passage 40 of the intake port 21 may be represented as a "passage cross sectional area".

Flows of Intake Air

As described above, the first inner wall 31 of the intake port 21 has the first concavely curved surface 41, and the second inner wall 32 of the intake port 21 has the second concavely curved surface 42. Providing the first and the second concavely curved surfaces 41 and 42 to the intake port 21 in this manner enables enhancing gas flows in the combustion chamber 20 and in the cylinder bore 14 while increasing a flow rate of intake air, as described below. The flow rate of intake air is referred to as an "intake air flow rate", hereinafter.

Figure 10:
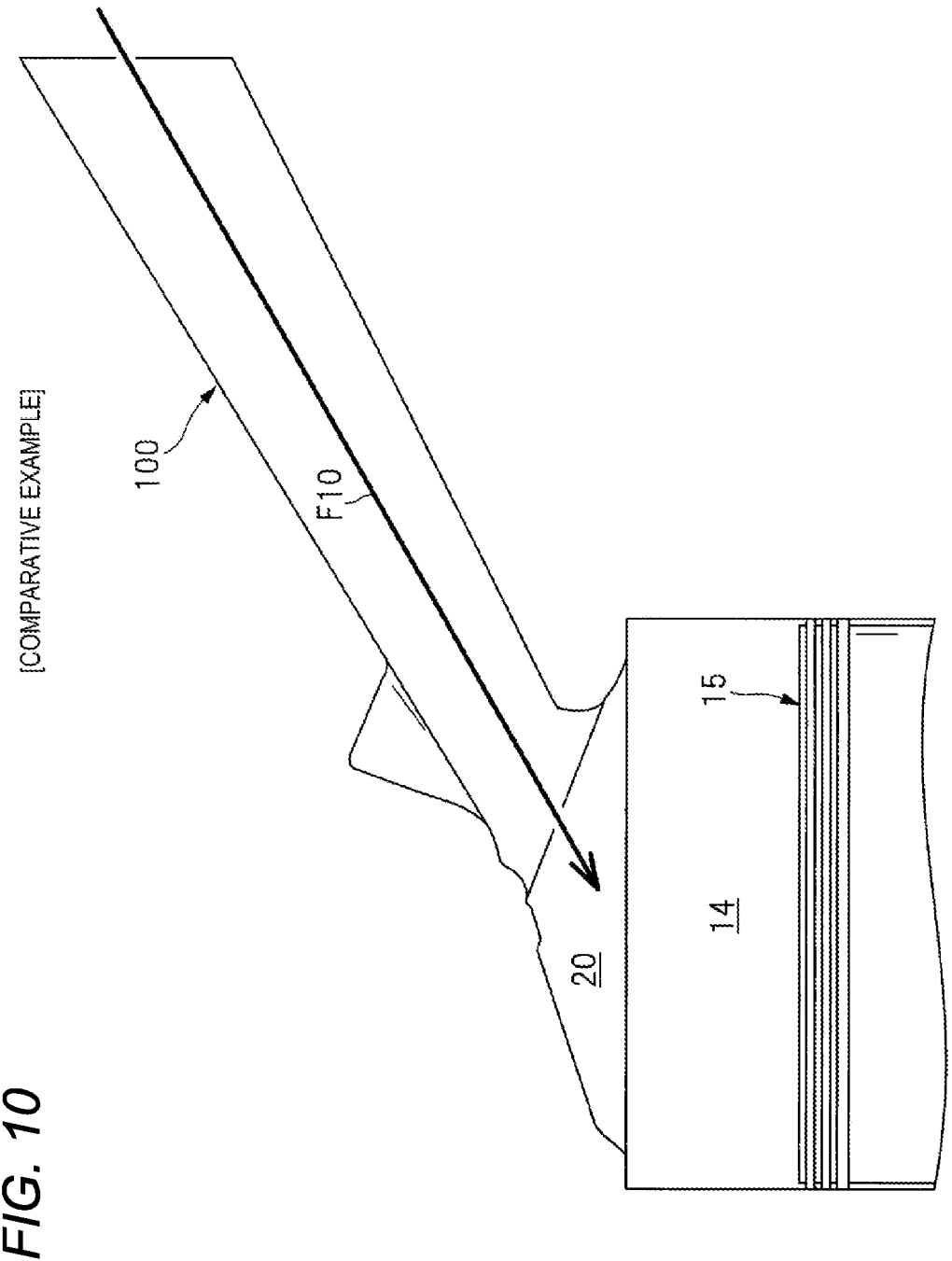
FIG. 10 simply illustrates a flow of intake air that passes through an intake port of Comparative Example.

FIG. 9 simply illustrates flows of intake air that passes through the intake port 21 of Example 1. FIG. 10 simply illustrates a flow of intake air that passes through an intake port 100 of Comparative Example. As indicated by the arrow F1 in FIG. 9, in the intake port 21 of Example 1, intake air flowing close to the first inner wall 31 flows to the combustion chamber 20 while varying the flowing direction along the first concavely curved surface 41. Moreover, as indicated by the arrow F2, intake air flowing close to the second inner wall 32 flows to the combustion chamber 20 while varying the flowing direction along the second concavely curved surface 42. As a result, in the intake port 21 of Example 1, a flow of the intake air, as indicated by the arrow F3, is generated in the combustion chamber 20 and in the cylinder bore 14. On the other hand, as illustrated in FIG. 10, in the intake port 100 of Comparative Example extending straightly to the combustion chamber 20, intake air flows straightly to the combustion chamber 20, as indicated by the arrow F10.

Figure 11:
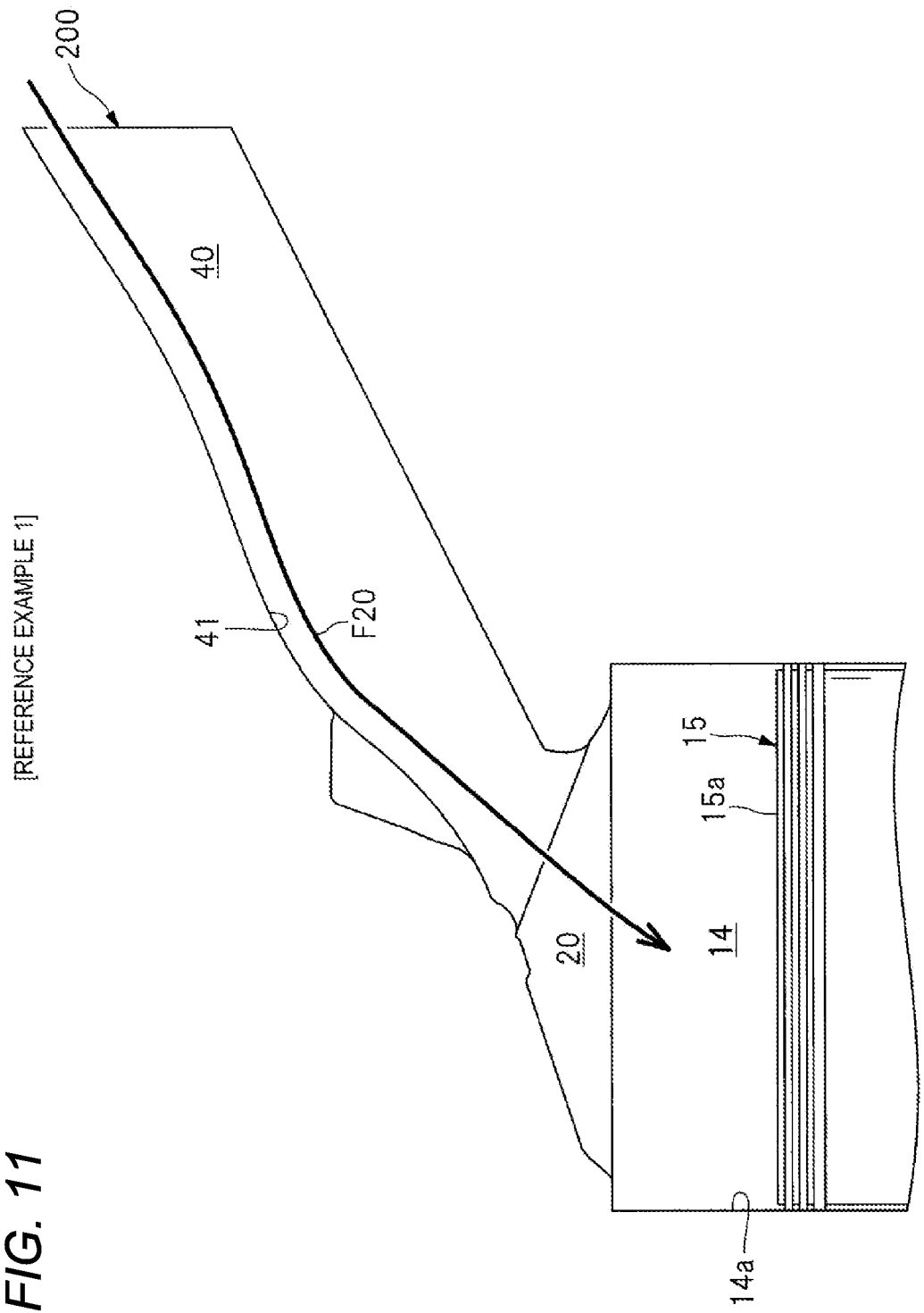
FIG. 11 simply illustrates a flow of intake air that passes through an intake port of Reference Example 1.
Figure 12:
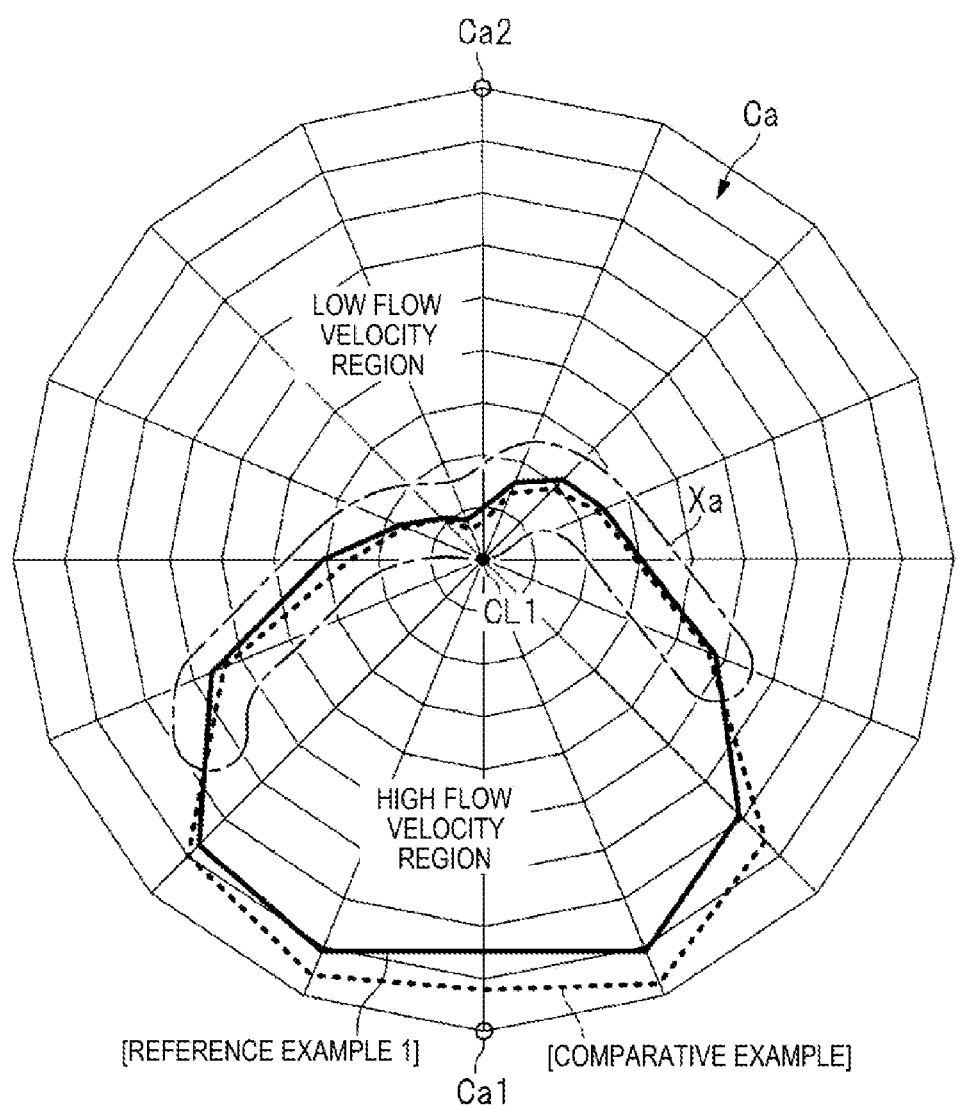
FIG. 12 illustrates simulation results of speed regions of intake air that flows into the combustion chamber from each of the intake ports of Reference Example 1 and Comparative Example.
Figure 13:
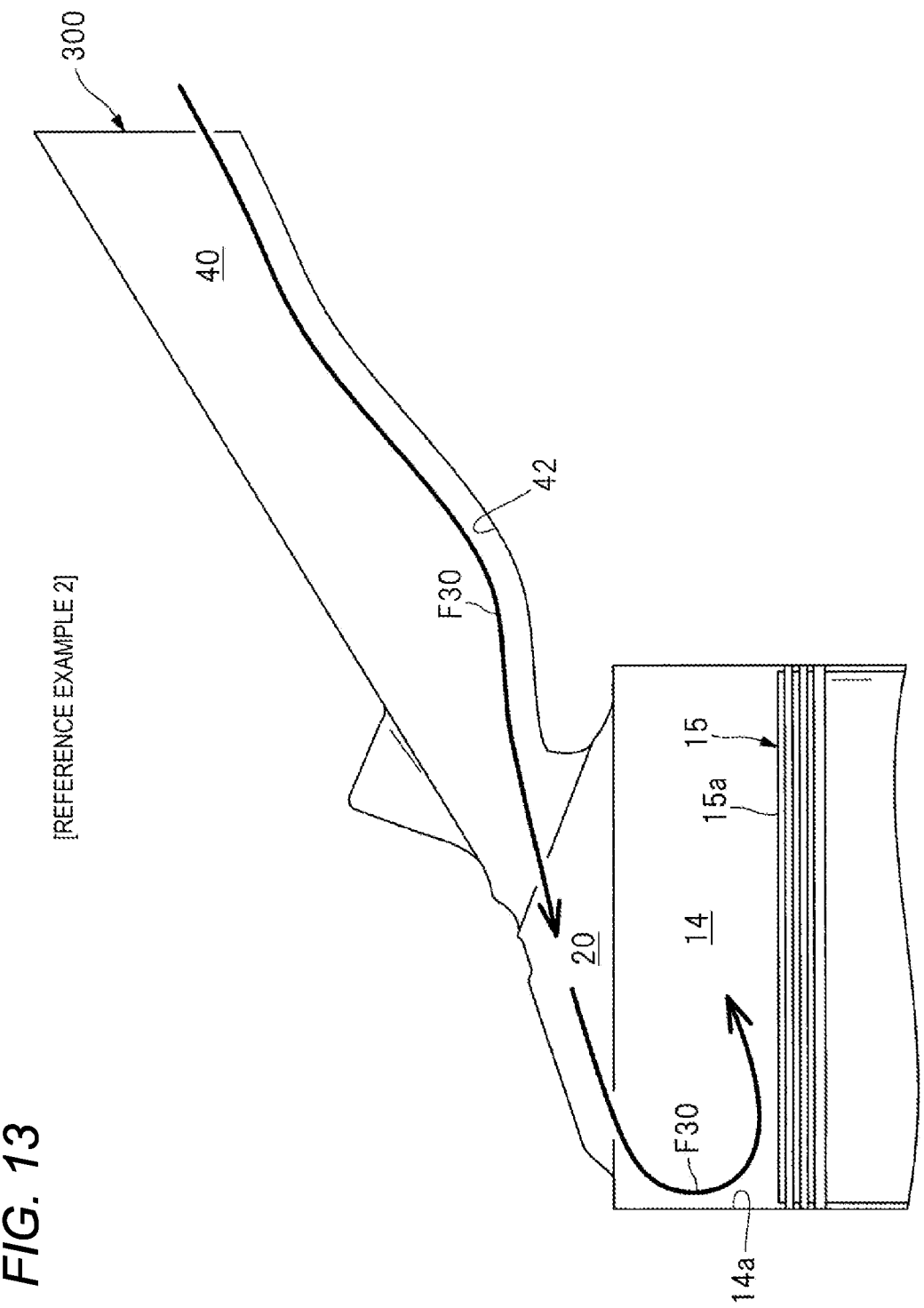
FIG. 13 simply illustrates flows of intake air that passes through an intake port of Reference Example 2.
Figure 14:
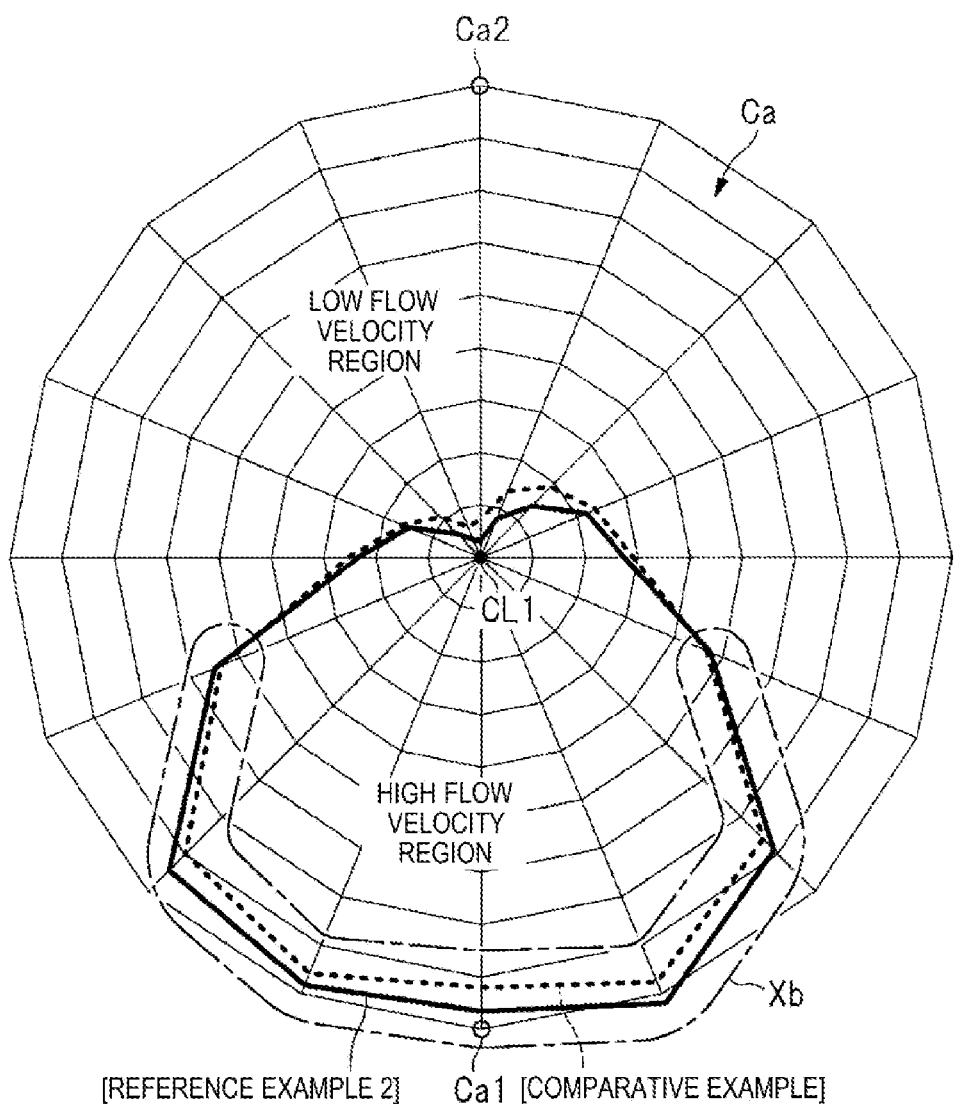
FIG. 14 illustrates simulation results of speed regions of intake air that flows into the combustion chamber from each of the intake ports of Reference Example 2 and Comparative Example.
Figure 15:
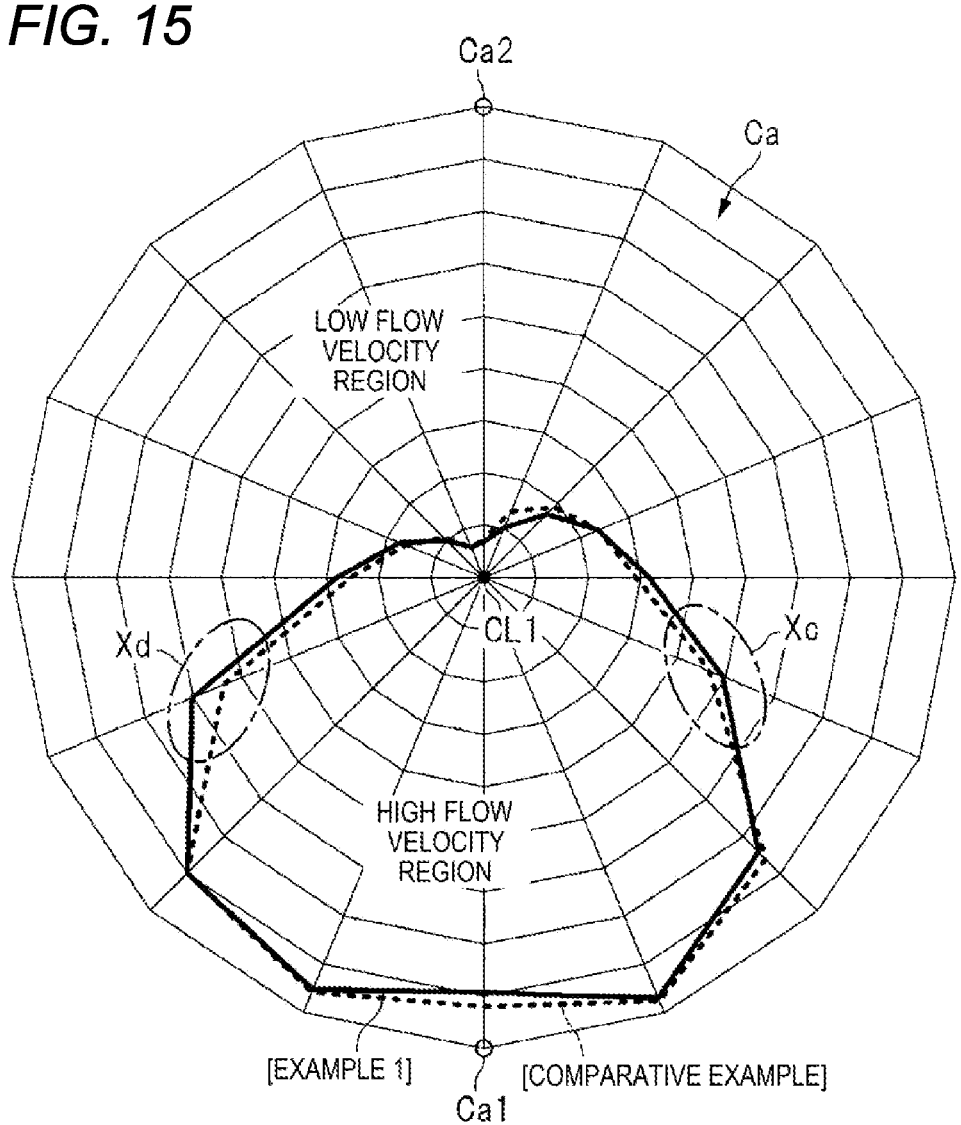
FIG. 15 illustrates simulation results of speed regions of intake air that flows into the combustion chamber from the intake ports of Example 1 and Comparative Example.
Figure 16:
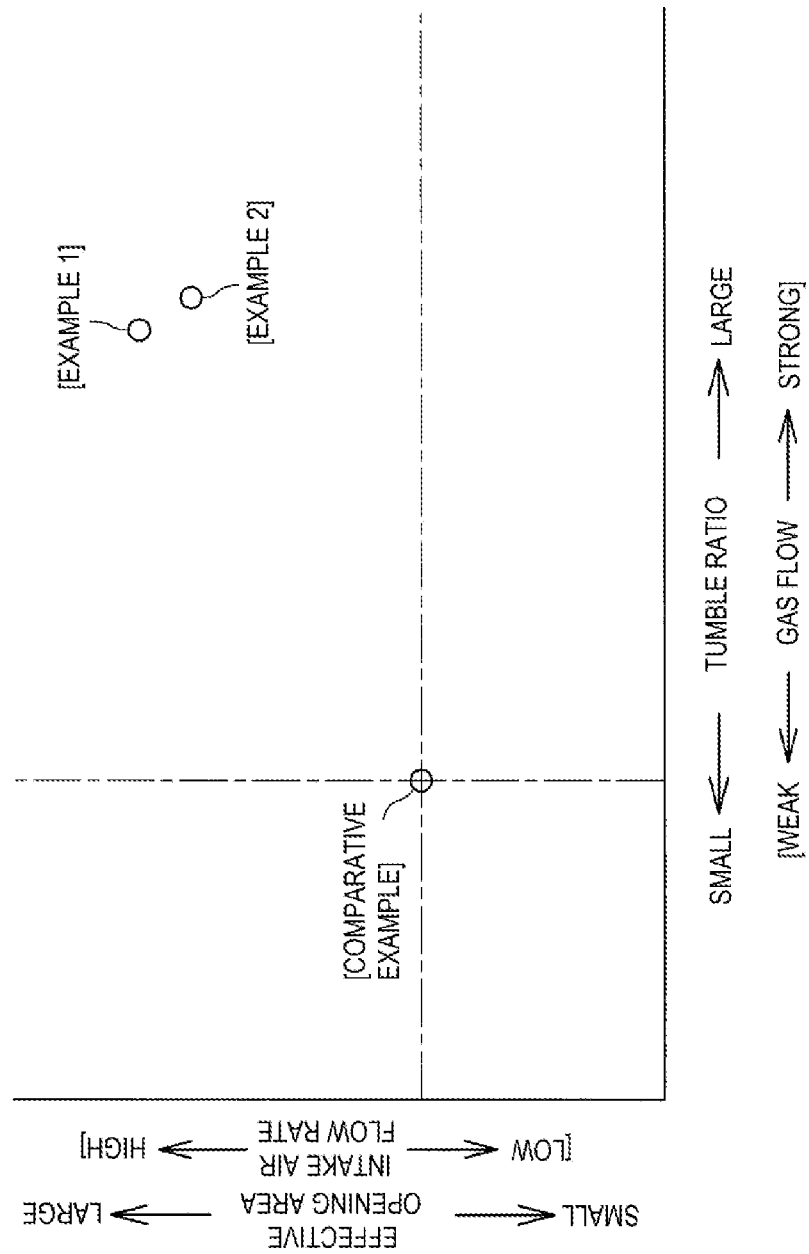
FIG. 16 illustrates simulation results of an intake air flow rate and a gas flow at the intake ports.

Next, increasing an intake air flow rate and enhancing a gas flow by the intake port 21 of Example 1 will be described by comparing with the intake port 100 of Comparative Example and with intake ports 200 and 300 of Reference Examples 1 and 2. FIG. 11 simply illustrates a flow of intake air that passes through the intake port 200 of Reference Example 1. FIG. 12 illustrates simulation results of speed regions of intake air that flows into the combustion chamber 20 from each of the intake ports 200 and 100 of Reference Example 1 and Comparative Example. FIG. 13 simply illustrates flows of intake air that passes through the intake port 300 of Reference Example 2. FIG. 14 illustrates simulation results of speed regions of intake air that flows into the combustion chamber 20 from each of the intake ports 300 and 100 of Reference Example 2 and Comparative Example. FIG. 15 illustrates simulation results of speed regions of intake air that flows into the combustion chamber 20 from each of the intake ports 21 and 100 of Example 1 and Comparative Example. FIG. 16 illustrates simulation results of an intake air flow rate and a gas flow at the intake ports 21 and 100.

The circular range Ca illustrated in FIG. 12, 14, or 15 is a circular range set in the vicinity of the valve seat 35, as indicated by the two-dot chain line Ca in FIG. 5. The reference point Ca1 illustrated in FIG. 5 or 12 or other drawings is a point positioned on a center side, that is, on a radially inward side, of the cylinder bore 14. The reference point Ca2 illustrated in FIG. 5 or 12 or other drawings is a point positioned on an inner wall side, that is, on a radially outward side, of the cylinder bore 14. In FIGS. 12, 14, and 15, a speed boundary of intake air flowing into the combustion chamber 20 from each of the intake ports 200 and 300 of Reference Examples 1 and 2 and the intake port 21 of Example 1 is, indicated by a solid line, and a speed boundary of intake air flowing into the combustion chamber 20 from the intake port 100 of Comparative Example, is indicated by a broken line. That is, in FIGS. 12, 14, and 15, the region enclosed by the solid line or the broken line is a high flow velocity region in which intake air exceeding a specific speed flows. The tumble ratio that is described beside the horizontal axis in FIG. 16 is an indicator showing strength of a gas flow in the cylinder bore 14. As the value of the tumble ratio increases, the degree of a gas flow, that is, the degree of a tumble flow, increases. The longitudinal axis in FIG. 16 shows an effective opening area of a passage through which intake air passes. As the value of the effective opening area increases, the intake air flow rate increases.

As illustrated in FIG. 11, the intake port 200 of Reference Example 1 has the first concavely curved surface 41 of the intake port 21. As indicated by the reference symbol Xa in FIG. 12, the high flow velocity region extends more toward the reference point Ca2 in the case of using the intake port 200 of Reference Example 1 than in the case of using the intake port 100 of Comparative Example. The reason for this is that, in the intake port 200 having the first concavely curved surface 41, intake air varies the flowing direction along the first concavely curved surface 41, as indicated by the arrow F20 in FIG. 11, and the intake air flows toward the bottom of the cylinder bore 14, that is, toward a crown 15a of a piston 15. Thus, the opening area of the intake port 21 is widely used when the intake air flows into the combustion chamber 20, whereby the intake air easily flows into the combustion chamber 20. This results in increase in the flow rate of intake air flowing into the combustion chamber 20 in the intake port 200 of Reference Example 1, more than in the intake port 100 of Comparative Example. That is, the flow along the first concavely curved surface 41 of the intake port 200 is a flow of intake air contributing to increase in the intake air flow rate.

As illustrated in FIG. 13, the intake port 300 of Reference Example 2 has the second concavely curved surface 42 of the intake port 21. As indicated by the reference symbol Xb in FIG. 14, the high flow velocity region extends more toward the reference point Ca1 in the case of using the intake port 300 of Reference Example 2 than in the case of using the intake port 100 of Comparative Example. The reason for this is that, in the intake port 300 having the second concavely curved surface 42, intake air varies the flowing direction along the second concavely curved surface 42, as indicated by the arrow F30 in FIG. 13, and the intake air flows toward an inner wall 14a of the cylinder bore 14. This makes the intake air move along the inner wall 14a of the cylinder bore 14, whereby the flow of the intake air flowing into the combustion chamber 20 is enhanced. This results in enhancing the tumble flow in the combustion chamber 20 in the intake port 300 of Reference Example 2, more than in the intake port 100 of Comparative Example. That is, the flow along the second concavely curved surface 42 of the intake port 300 is a flow of intake air contributing to enhancement of the gas flow.

In another example, as indicated by the reference symbols Xc and Xd in FIG. 15, the high flow velocity region extends in the vicinity of port side parts 35a of the valve seat 35 in the case of using the intake port 21 of Example 1, more than in the case of using the intake port 100 of Comparative Example. The reason for this is that, in the intake port 21 having the first and the second concavely curved surfaces 41 and 42, flows of intake air vary the directions along the first and the second concavely curved surfaces 41 and 42, as indicated by the arrows F1 and F2 in FIG. 9, and these flows act to generate a flow of intake air, as indicated by the arrow F3. That is, in the intake port 21 of Example 1, the flow of intake air contributing to increase in the intake air flow rate, as indicated by the arrow F1 in FIG. 9, and the flow of intake air contributing to enhancement of the gas flow, as indicated by the arrow F2 in FIG. 9, mutually act to generate the flow of intake air contributing to both flow rate increase and flow enhancement, as indicated by the arrow F3 in FIG. 9. This enables enhancing the gas flow while increasing the intake air flow rate in the intake port 21 of Example 1, compared with the intake port 100 of Comparative Example, as illustrated in FIG. 16.

As described above, providing the first concavely curved surface 41 enhances the flow of intake air that contributes to increase in the intake air flow rate, and providing the second concavely curved surface 42 enhances the flow of intake air that contributes to enhancement of the gas flow, e.g., a tumble flow. Accordingly, in the intake port 21 of Example 1 having both of the first and the second concavely curved surfaces 41 and 42, the flow of intake air that contributes to increase in the intake air flow rate as well as the flow of intake air that contributes to enhancement of the gas flow is reliably obtained. Thus, increasing the flow rate and enhancing the flow of intake air are both achieved.

OTHER EMBODIMENTS

Figure 17:
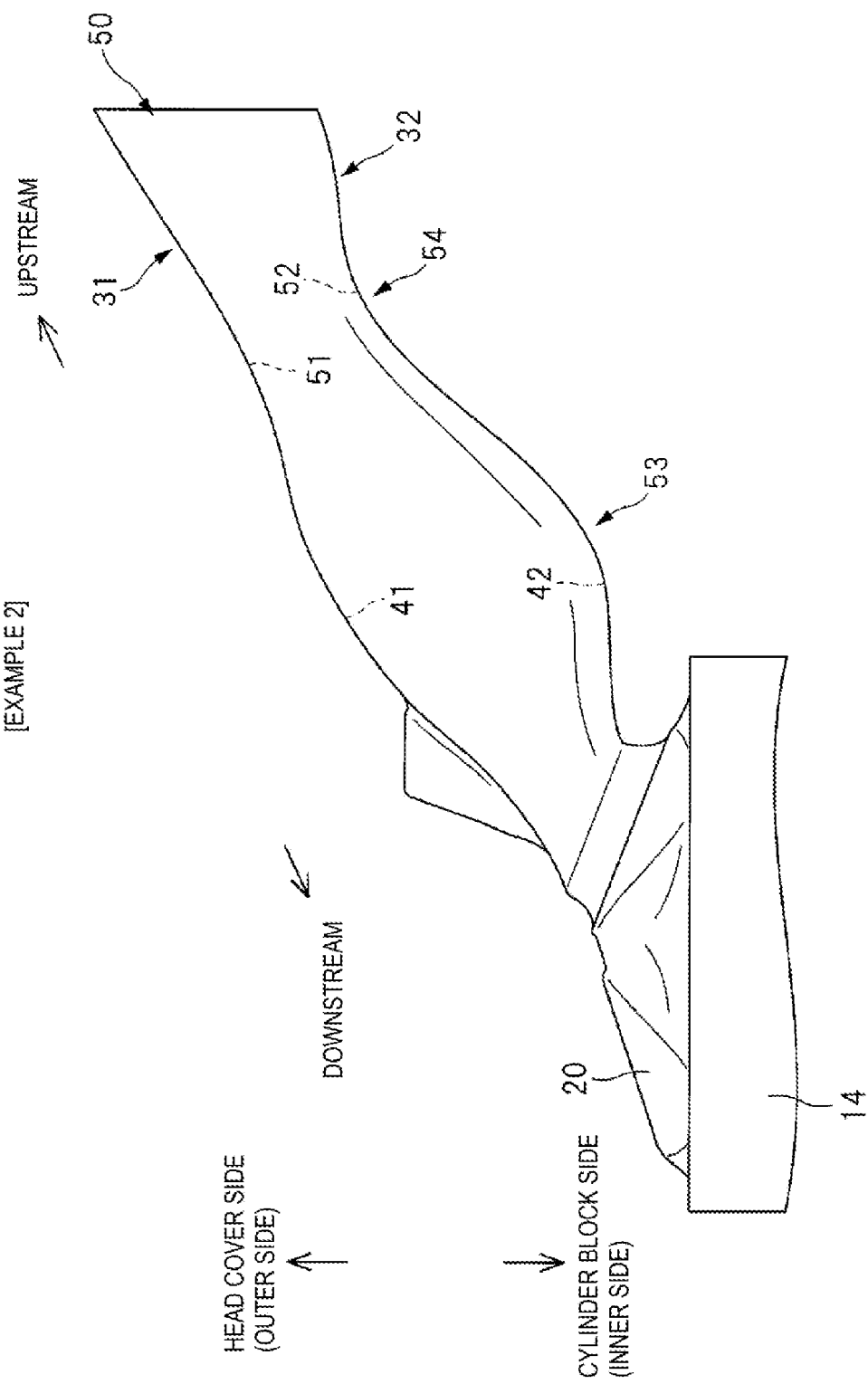
FIG. 17 illustrates shapes of an intake port and the combustion chamber of Example 2 of the disclosure.
Figure 18:
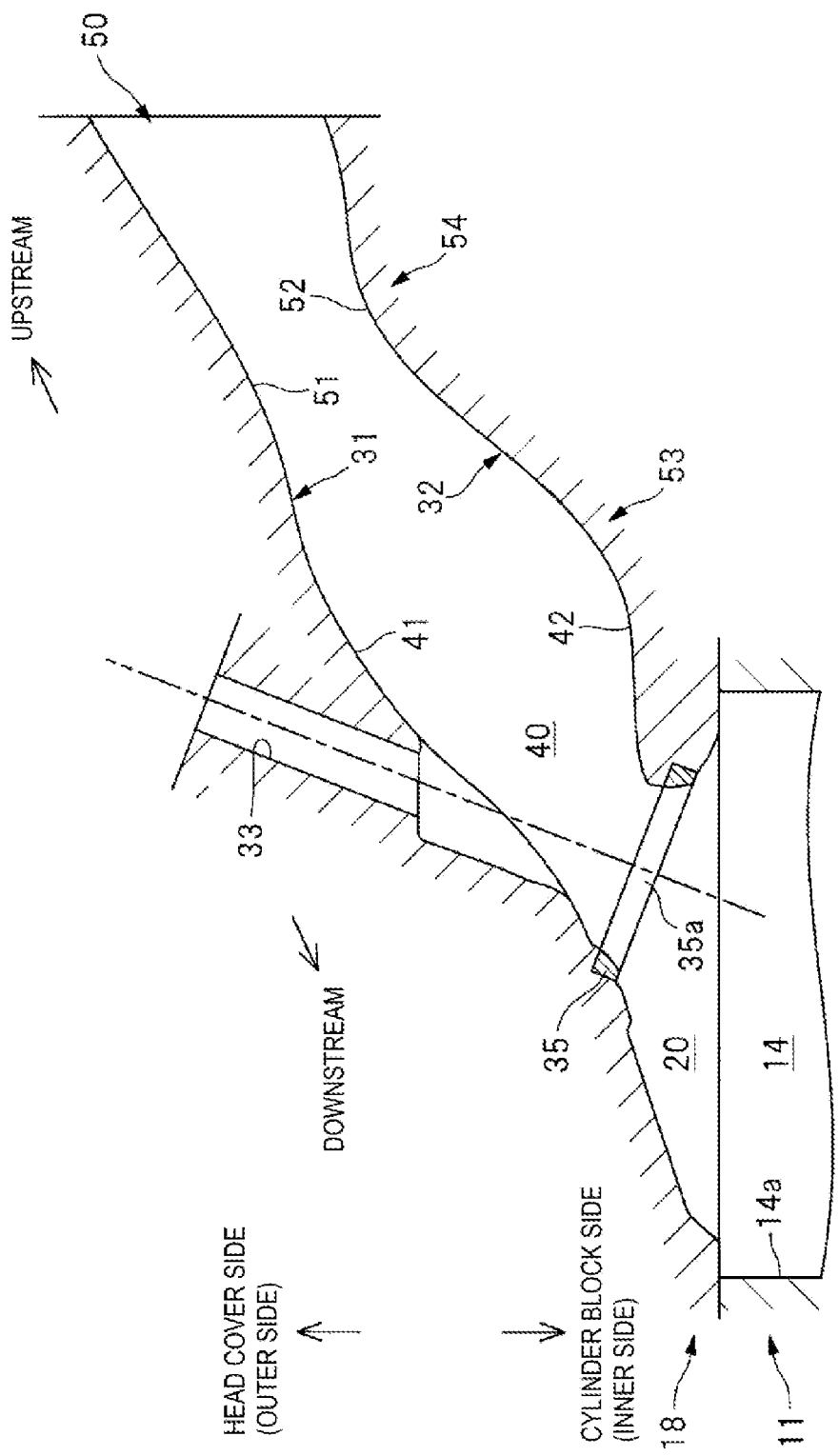
FIG. 18 is a sectional view illustrating the intake port and the combustion chamber, along the imaginary plane X in FIG. 4.
Figure 19:
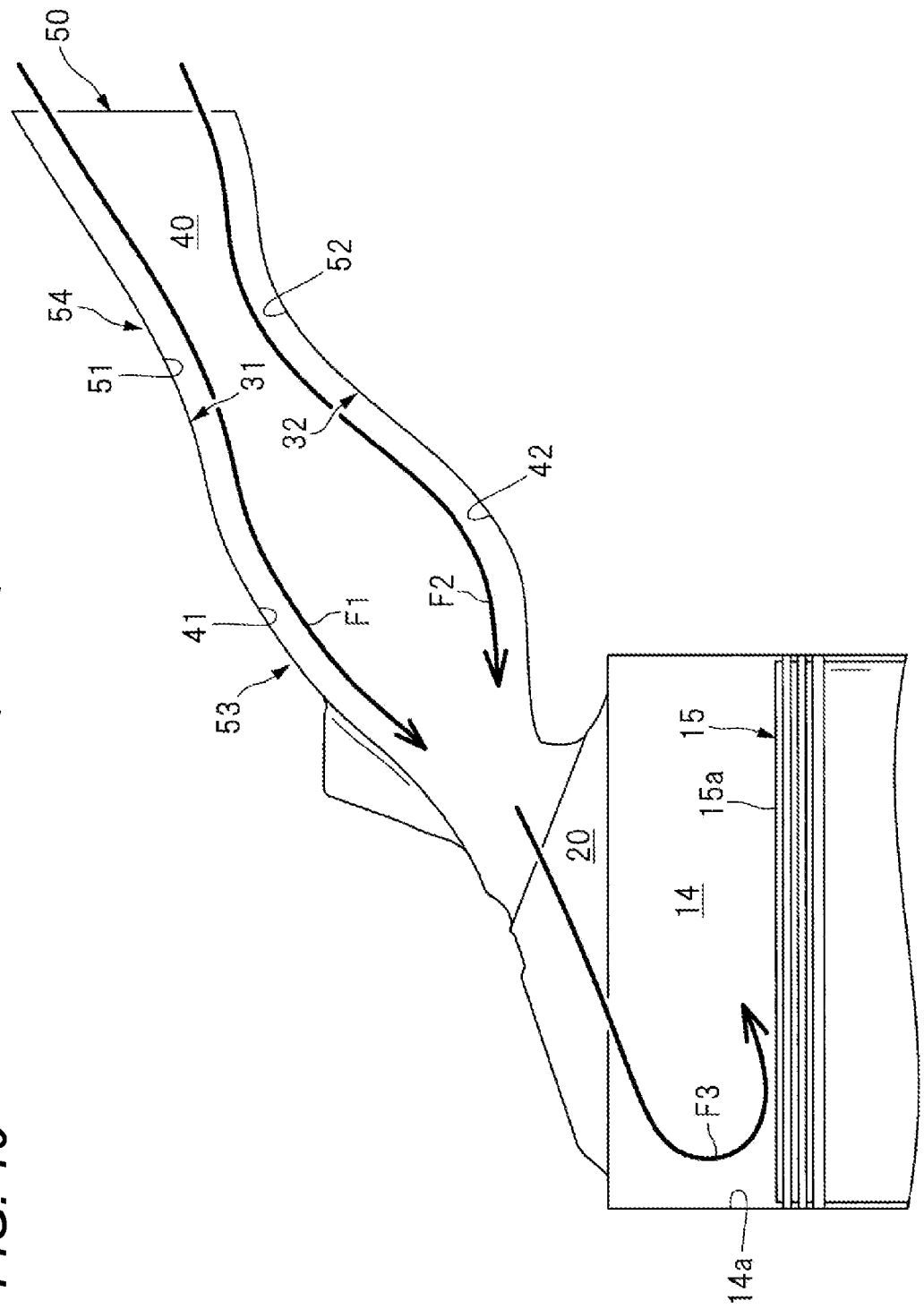
FIG. 19 simply illustrates flows of intake air that passes through the intake port.

Next, other embodiments of the disclosure will be described. FIG. 17 illustrates shapes of an intake port 50 and the combustion chamber 20 of Example 2 of the disclosure. FIG. 18 is a sectional view illustrating the intake port 50 and the combustion chamber 20, along the imaginary plane X in FIG. 4. FIG. 19 simply illustrates flows of intake air that passes through the intake port 50. It is noted that the same parts as the parts illustrated in FIGS. 3 and 5 are denoted by the same reference symbols in FIGS. 17 to 19 and descriptions thereof are omitted.

As illustrated in FIGS. 17 and 18, the first inner wall 31 of the intake port 50 has the first concavely curved surface 41, and the second inner wall 32 of the intake port 50 has the second concavely curved surface 42. The first concavely curved surface 41 is concaved toward the head cover 19 to expand the intake passage 40. The second concavely curved surface 42 is concaved toward the cylinder block 11 to expand the intake passage 40. The first inner wall 31 of the intake port 50 also has a first convexly curved surface 51 on the upstream side of the first concavely curved surface 41 in a continuous manner. The first convexly curved surface 51 is convexed toward the cylinder block 11 to narrow the intake passage 40. The second inner wall 32 of the intake port 50 also has a second convexly curved surface 52 on the upstream side of the second concavely curved surface 42 in a continuous manner. The second convexly curved surface 52 is convexed toward the head cover 19 to narrow the intake passage 40. That is, the intake port 50 has an expanded part 53 that is formed of the first and the second concavely curved surfaces 41 and 42 and also has a narrowed part 54 that is formed of the first and the second convexly curved surfaces 51 and 52.

The intake port 50 having such a narrowed part 54 can also guide intake air to the combustion chamber 20 as in the case of the intake port 21 of Example 1, due to having both of the first and the second concavely curved surfaces 41 and 42. In more detail, as indicated by the arrow F1 in FIG. 19, also in the intake port 50 of Example 2, intake air flowing close to the first inner wall 31 flows to the combustion chamber 20 while varying the flowing direction along the first concavely curved surface 41. Moreover, as indicated by the arrow F2, intake air flowing close to the second inner wall 32 flows to the combustion chamber 20 while varying the flowing direction along the second concavely curved surface 42. That is, as in the case of the intake port 21 of Example 1, the flow of intake air contributing to increase in the intake air flow rate, as indicated by the arrow F1 in FIG. 19, and the flow of intake air contributing to enhancement of the gas flow, as indicated by the arrow F2 in FIG. 19, mutually act to generate the flow of intake air that contributes to both flow rate increase and flow enhancement, as indicated by the arrow F3 in FIG. 19. Thus, the intake port 50 of Example 2 also enables achieving both increasing the flow rate and enhancing the flow of intake air. This makes it possible to enhance the gas flow while increasing the intake air flow rate also in the case of using the intake port 50 of Example 2, compared with the case of using the intake port 100 of Comparative Example, as illustrated in FIG. 16.

It is needless to say that the disclosure is not limited to the foregoing embodiments and various modifications can be made thereto within the scope that does not depart from the gist thereof. Of course, although the cross sectional shape of the intake port 21 illustrated in FIGS. 8A to 8C is a rounded quadrangular shape, the sectional shape is not limited thereto and can be any shape. For example, the first and the second concavely curved surfaces 41 and 42 may be formed in an intake port 21 or 50 having a circular or elliptic cross sectional shape. In another example, although the mutually separated two intake ports 21 are communicated with the combustion chamber 20 in the example illustrated in FIG. 4, the configuration is not limited thereto, and one intake port having branched two port parts may be communicated with the combustion chamber 20.

The invention claimed is:
1. An engine comprising:
a combustion chamber; and
a cylinder head including an intake port communicating with the combustion chamber and a head cover, wherein
the intake port comprises a first inner wall and a second inner wall as inner walls that form a quadrangular shape and that are provided from an upstream side to a downstream side,
a valve guide hole opens onto the first inner wall,
the second inner wall faces the first inner wall,
the first inner wall comprises a first concavely curved surface configured to vary a flowing direction of intake air, the first concavely curved surface being formed on the first inner wall closer to the downstream side than the upstream side and the first concavely curved surface is concaved toward the head cover, and
the second inner wall comprises a second concavely curved surface configured to vary the flowing direction of the intake air, the second concavely curved surface being formed on the second inner wall closer to the downstream side than the upstream side and the second concavely curved surface is concaved toward a cylinder block,
wherein the second concavely curved surface faces the first concavely curved surface,
wherein, in a section where the first and second concavely curved surfaces are formed, a cross sectional area of the intake port increases and then decreases from the upstream side to the downstream side,
wherein the engine further includes a narrowed section, wherein the narrowed section includes a first convexly curved surface and a second convexly curved surface,
wherein the first convexly curved surface of the narrowed section is formed on an upstream side of the first concavely curved surface of the first inner wall, and
wherein the second convexly curved surface of the narrowed section is formed on an upstream side of the second concavely curved surface of the second inner wall.

2. The engine according to claim 1, wherein,
among angles between tangent lines of the first concavely curved surface and a center line of the valve guide hole, acute angles decrease from the upstream side to the downstream side, and
among angles between tangent lines of the second concavely curved surface and the center line of the valve guide hole, acute angles increase from the upstream side to the downstream side.

3. The engine according to claim 2, wherein
the tangent lines of the first concavely curved surface and the tangent lines of the second concavely curved surface are in an imaginary plane including the center line of the valve guide hole.

4. The engine according to claim 1, wherein
the first concavely curved surface and the second concavely curved surface at least partially face each other.

5. The engine according to claim 2, wherein
the first concavely curved surface and the second concavely curved surface at least partially face each other.

6. The engine according to claim 3, wherein
the first concavely curved surface and the second concavely curved surface at least partially face each other.

7. The engine according to claim 1, wherein
a passage cross sectional area of the intake port increases and then decreases from the upstream side to the downstream side.

8. The engine according to claim 2, wherein
a passage cross sectional area of the intake port increases and then decreases from the upstream side to the downstream side.

9. The engine according to claim 3, wherein
a passage cross sectional area of the intake port increases and then decreases from the upstream side to the downstream side.

10. The engine according to claim 4, wherein
a passage cross sectional area of the intake port increases and then decreases from the upstream side to the downstream side.

11. The engine according to claim 5, wherein
a passage cross sectional area of the intake port increases and then decreases from the upstream side to the downstream side.

12. The engine according to claim 6, wherein
a passage cross sectional area of the intake port increases and then decreases from the upstream side to the downstream side.

13. The engine according to claim 1, wherein the intake port further comprises a third inner wall and a fourth inner wall as the inner walls that form the quadrangular shape, the third inner wall intersecting the first inner wall and the second inner wall, the fourth inner wall facing the third inner wall,
wherein a distance between the third inner wall and the fourth inner wall, at a portion of the intake port where the first concavely curved surface and the second concavely curved surface are formed, is constant.

14. The engine according to claim 1, wherein the valve guide hole is disposed at an end of the downstream side of the first concavely curved surface.

* * * * *